(12) United States Patent
Bai et al.

(10) Patent No.: US 7,455,762 B2
(45) Date of Patent: *Nov. 25, 2008

(54) SELECTIVE HYDRODESULFURIZATION PROCESS

(75) Inventors: Chuansheng Bai, Phillipsburg, NJ (US);
Gary B. McVicker, Califon, NJ (US);
Stuart S. Shih, Gainesville, VA (US);
Michael C. Kerby, Center Valley, PA (US); Edward A. Lemon, Jr., Easton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 265 days.

This patent is subject to a terminal disclaimer.

(21) Appl. No.: 11/189,666

(22) Filed: Jul. 26, 2005

(65) Prior Publication Data

US 2006/0049083 A1 Mar. 9, 2006

Related U.S. Application Data

(60) Provisional application No. 60/606,006, filed on Aug. 31, 2004.

(51) Int. Cl.
*C10G 45/08* (2006.01)
(52) U.S. Cl. .................... 208/216 R; 208/213; 208/217
(58) Field of Classification Search .............. 208/177, 208/208 R, 209, 213, 216 R, 216 PP, 217, 208/243, 244, 245
See application file for complete search history.

(56) References Cited

U.S. PATENT DOCUMENTS

| 4,631,267 A | * | 12/1986 | Lachman et al. ............ 502/439 |
|---|---|---|---|
| 5,334,368 A | | 8/1994 | Beck et al. |
| 5,589,147 A | | 12/1996 | Farnos et al. |
| 5,705,726 A | | 1/1998 | Abichandani et al. |
| 6,852,214 B1 | | 2/2005 | Chester et al. |
| 6,974,787 B2 | | 12/2005 | Chester et al. |
| 2003/0102254 A1 | * | 6/2003 | Eijsbouts et al. ........ 208/216 R |
| 2004/0116749 A1 | | 6/2004 | Levin et al. |
| 2006/0052233 A1 | | 3/2006 | Beeckman et al. |

FOREIGN PATENT DOCUMENTS

| EP | 1050571 A1 | 11/2000 |
|---|---|---|
| WO | WO 9301884 | 2/1993 |
| WO | WO 2004052537 A1 | 6/2004 |
| WO | WO 2006071963 A1 * | 7/2006 |

OTHER PUBLICATIONS

C. M. Song et al., Synthesis and Characterization of MCM-41-Type Composite Materials Prepared From ZSM-5 Zeolite, 15 J. Porous Mater. 205-211 (2008).*
D. T. On et al., Perspectives in Catalytic Applications of Mesostructured Materials, 253 Appl. Catal. A 545-602 (2003).*
Angie Wang, et al., "Hydrodesulfurization of Dibenzothiophene over Siliceous MCM-41-Supported Catalysts," Journal of Catalysis 199, 19-29 (2001).
Jorge Ramirez, et al., "Characterization and catalytic activity of CoMo HDS catalysts supported on alumina-MCM-41," Applied Catalysis A: General 197 (2000) 69-78.
Anjie Wang, et al., "Hydrodesulfurization of Dibenzothiophene over Siliceous MCM-41-Supported Catalysts," Journal of Catalysis 199, 19-29 (2001).
Adam C. Sorensen, et al., "Mo-Doped Mesoporous Silica for Thiopene Hydrodesulfurization: Comparison of Materials and Methods," Chem. Mater. 2004, 16, 2157-2164.

* cited by examiner

*Primary Examiner*—Glenn Caldarola
*Assistant Examiner*—Randy Boyer
(74) *Attorney, Agent, or Firm*—Lawrence E. Carter

(57) ABSTRACT

This invention relates to a process for selectively hydrodesulfurizing naphtha feedstreams using a catalyst comprising at least one hydrodesulfurizing metal supported on a low acidity, ordered mesoporous support material.

25 Claims, 1 Drawing Sheet

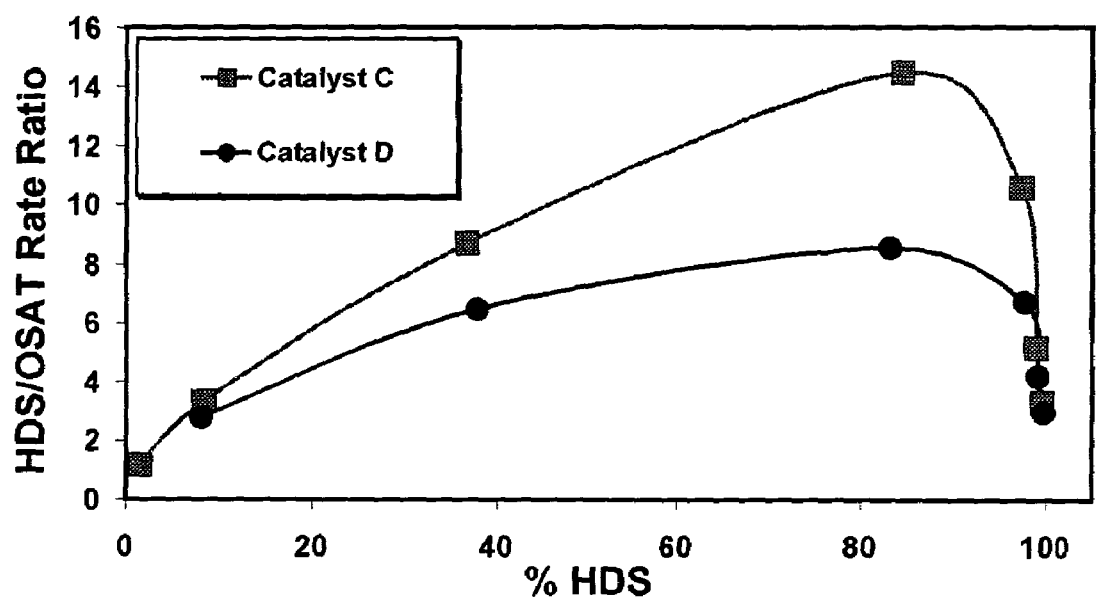

SELECTIVE HYDRODESULFURIZATION PROCESS

CROSS-REFERENCE TO RELATED APPLICATION

This application claims benefit of U.S. Provisional Patent Application Ser. No. 60/606,006 filed Aug. 31, 2004.

FIELD OF THE INVENTION

The present invention relates to a process for selectively hydrodesulfurizing naphtha feedstreams using a catalyst comprising at least one hydrodesulfurizing metal supported on a low acidity, ordered mesoporous support material.

BACKGROUND OF THE INVENTION

Gasoline comprises naphtha boiling-range hydrocarbons ("naphtha") obtained from natural and/or synthetic sources. Naphtha, especially naphtha obtained from a cracking process, such as fluidized catalytic cracking and coking, typically contains undesirable sulfur species. However, naphtha also can contain valuable olefins which contribute to the octane number of the resulting gasoline, and it is, consequently, highly desirable not to saturate them to lower octane paraffins during processing. Continuing regulatory pressure to lower the amount of sulfur present in naphtha has resulted in a continuing need for catalysts having ever improved desulfurization properties. While conventional (i.e., known to those skilled in the art of naphtha desulfurization) hydrodesulfurization catalysts are available, there is a continuing need for improved catalysts that are capable of combining hydrodesulfurization without undue olefin saturation.

SUMMARY OF THE INVENTION

In an embodiment, the invention relates to a selective hydrodesulfurization catalyst comprising at least one hydrodesulfurizing metal supported on a low acidity, ordered mesoporous support material and bound with a silica binder derived from silicone resin.

In another embodiment, the invention relates to a selective hydrodesulfurization process, comprising:
  contacting a naphtha feedstream containing sulfur and olefin with a catalytically effective amount of a catalyst comprising at least one hydrodesulfurizing metal supported on a low acidity, ordered mesoporous support material under selective catalytic hydrodesulfurization conditions.

Yet another embodiment of the invention relates to a selective hydrodesulfurization process, comprising:
  contacting a naphtha feedstream containing sulfur and olefin with a catalytically effective amount of a catalyst comprising at least one hydrodesulfurizing metal supported on a low acidity, ordered mesoporous support material and silica binder derived from silicone resin under selective catalytic hydrodesulfurizing conditions.

In yet another embodiment, the invention relates to a selective hydrodesulfurization catalyst comprising at least one hydrodesulfurizing metal supported on a low acidity, ordered mesoporous support material, the selective hydrodesulfurization catalyst being made by a process comprising:
  (a) combining the low acidity, ordered mesoporous support material with silicone resin to form a mixture of mesoporous support material and silicone resin,
  (b) calcining the mixture from step (a) to convert silicone resin to silica binder,
  (c) impregnating the calcined low acidity, ordered mesoporous support material from step (b) with an aqueous precursor containing at least one metal to form a metal-impregnated, low acidity, ordered mesoporous support material, and
  (d) heating the calcined metal-impregnated, low acidity, ordered mesoporous support material from step (c) at a drying temperature and drying pressure and for a drying time to remove water and form a dried, metal-impregnated, low acidity, ordered mesoporous support material. In a preferred embodiment, the combining of ordered mesoporous support material with silicone resin is free of added organic solvent.

In an embodiment, the process further comprises sulfiding the metal-impregnated low acidity, ordered mesoporous support under sulfiding conditions for a sulfiding time to form the selective hydrodesulfurization catalyst.

BRIEF DESCRIPTION OF THE DRAWING

The FIGURE is a graph showing the rate ratio of hydrodesulfurization/olefin saturation vs. amount of hydrodesulfurization for two catalysts having different support acidities.

DETAILED DESCRIPTION OF THE INVENTION

The invention relates to (I) a selective hydrodesulfurization catalyst, (II) a selective hydrodesulfurization process, and (III) method for making a selective hydrodesulfurization catalyst.

(I) Selective Hydrodesulfurization Catalysts

In one embodiment, the invention relates to a selective hydrodesulfurization catalyst comprising at least one catalytic metal supported on a low acidity, ordered mesoporous support material and bound with a silica binder. As used herein, the terms "macropores" and "mesopores" are as defined in *Pure Appl. Chem.*, 45 (1976), 79, namely as pores whose diameter is above 50 nm (macropores) or whose diameter is from 2 nm and 50 nm (mesopores). The catalytic metal or metals can be Group VIA and non-noble metal Group VIIIA metals. The Groups are given in the *Periodic Table of the Elements* by Sargent-Welch Scientific Company, No. S-18806, Copyright 1979. More particularly, the metal is selected from at least one of Mo, Co, Ni, Fe, W. More than one such metal can be used. Total metal loading on the catalyst may range from 4 to 40 wt. % metals, based on catalyst, preferably 10 to 30 wt. %.

The support comprises one or more low acidity, ordered mesoporous materials, such as molecular sieve. The term "molecular sieve" refers to ordered structures having pore sizes suitable for adsorbing molecules and that are capable of separating components of a mixture on the basis of molecular size and shape differences. The low acidity, ordered mesoporous materials may be crystalline, that is, having sufficient order to provide a diffraction pattern such as, for example, by X-ray, electron or neutron diffraction, following calcination, with at least one peak.

The term "low acidity" is used herein in the sense of a 2-methyl-2 pentene reaction test and the resulting rate ratio, as described in Kramer and McVicker, *Accounts of Chemical Research*, 19, 78 (1986), and U.S. Pat. No. 5,420,092. This scale for evaluating the acidity of materials is based on the isomerization of 2-methyl-2-pentene (2MP2). The material to be evaluated is contacted with 2MP2 at a fixed temperature, typically in the range 200 to 250° C. The formation rates and rate ratios of the product hexene isomers of this test reaction reflect the acid site concentration and strength of the catalyst respectively. The product hexene isomers formed include (cis/trans)4-methylpent-2-ene (4MP2), (cis/trans)3-methylpent-2-ene (3MP2), and 2,3 dimethylbute-2-ene (2,3 DMB2). 4MP2 requires only a double bond shift, a reaction occurring on weak acid sites. 3MP2 requires a methyl group shift (i.e., stronger acidity than double bond shift), whereas 2,3DMB2 requires even stronger acidity to produce a second methyl branch. For a homologous series of solid acids, differences in 3MP2 rates normalized with respect to surface area reflect the density of acid sites possessing strengths sufficient to catalyze the skeletal isomerization. Since skeletal isomerization rates generally increase with increasing acid strength, the ratio of methyl group migration rate to double bond shift rate (the "Rate Ratio" herein) should increase with increasing acid strength. The Rate Ratio is expressed as the rate of (cis/trans) 3-methylpent-2-ene (3MP2) over (cis/trans)4-methylpent-2-ene (4MP2). The use of the Rate Ratio, in lieu of individual conversion rates, beneficially normalizes differences in acid site populations. Thus the rate ratio of 3MP2 to 4MP2 provides a useful scale of acidity and forms the basis of the definition of "low acidity" as that term is used herein. The rate ratio of 3MP2 to 4MP2 is "low acidity" at a ratio of 3.85 or less, preferably 3.25 or less, more preferably 3.00 or less. It should be noted that that these low acidity materials will have an Alpha value of about 1. The Alpha test is described in U.S. Pat. No. 3,354,078. However, the Alpha test is not as sensitive for evaluating acidity as the acidity scale based on the isomerization of 2MP2. Hence two different materials may have an Alpha value of 1, but may or may not meet the definition of "low acidity" as defined herein. Controlling the acidity of the support provides a means to hydrodesulfurize a naphtha feedstream while minimizing saturation of desirable olefins.

Where the low acidity, ordered mesoporous material contains silica and alumina, a high silica material is desired for low acidity. The silica to alumina molar ratio is preferably at least about 100, more preferably at least about 200, and most preferably at least about 300. Support porosity generally ranges from about 20 to about 75% by volume, or, alternatively, from about 20% to about 60% by volume. Support surface areas generally ranges upwards from about 20 $m^2/g$, or alternatively, from about 20 $m^2/g$ to at least about 200 $m^2/g$, or about 100 $m^2/g$ to at least about 400 $m^2/g$. Ordered mesoporous materials can accommodate surface areas up to about 1,000 $m^2/g$.

In an embodiment, the ordered mesoporous materials are of low acidity, inorganic, porous, non-layered, molecular sieve materials which, in their calcined forms, exhibit an X-ray diffraction pattern with at least one peak at a d-spacing greater than about 18 Angstrom Units (Å). They also have a benzene adsorption capacity of greater than 15 grams of benzene per 100 grams of the material at 50 torr and 25° C. Suitable ordered mesoporous materials include those synthesized using amphiphilic compounds as directing agents. Examples of such materials are described in U.S. Pat. No. 5,250,282. Examples of amphiphilic compounds are also disclosed in Winsor, *Chemical Reviews*, 68(1), 1968. Other suitable ordered mesoporous materials are disclosed in "Review of Ordered Mesoporous Materials," U. Ciesla and F. Schuth, *Microporous and Mesoporous Materials*, 27, (1999), 131-49. Suitable mesoporous materials include, by way of example, materials designated as SBA (Santa Barbara) such as SBA-2, SBA-15 and SBA-16, materials designated as FSM (Folding Sheet Mechanism) such as FSM-16 and KSW-2, materials designated as MSU (Michigan State) such as MSU-S and MSU-X, materials designated as TMS or Transition Metal Sieves, materials designated as FMMS or functionalized monolayers on mesoporous supports and materials designated as APM or Acid Prepared Mesostructure.

In an embodiment, the support material is characterized by a substantially uniform hexagonal honeycomb microstructure with uniform pores having a cell diameter greater than 2 nm and typically in the range of 2 to 50 nm, preferably 3 to 30 nm and most preferably from 3 to 20 nm. In a related embodiment, the low acidity, ordered mesoporous materials include the silicate ordered, mesoporous materials designated as M41S such as MCM-41, MCM-48 and MCM-50, including mixtures thereof, provided they are of sufficiently low acidity. MCM-41 can be synthesized as a metallosilicate with Broensted acid sites by incorporating a tetrahedrally coordinated trivalent element such as Al, Ga, B, or Fe within the silicate framework. Methods of preparation are described in U.S. Pat. Nos. 5,098,684, 5,102,643 and 5,837,639.

MCM-41 is characterized by a microstructure with a uniform, hexagonal arrangement of pores with diameters of at least about 2 nm. After calcination it exhibits an X-ray diffraction pattern with at least one d-spacing greater than about 18 Å and a hexagonal electron diffraction pattern that can be indexed with a $d_{100}$ value of greater than about 18 Å, which corresponds to the d-spacing of the peak in the X-ray diffraction pattern. The term "hexagonal" is intended to encompass not only materials that exhibit mathematically perfect hexagonal symmetry within the limits of experimental measurement, but also those with significant observable deviations from that ideal state. A working definition as applied to the microstructure of the ordered mesoporous support material would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give images recognizable as hexagonal.

MCM-41 and similar ordered mesoporous materials can be distinguished from other porous inorganic solids by the regularity of their large open pores, whose pore size more nearly resembles that of amorphous or paracrystalline materials, but whose regular arrangement and uniformity of size (pore size distribution within a single phase of, for example, ±25%, usually ± 15% or less of the average pore size of that phase) resemble more those of crystalline framework materials such as zeolites.

In an embodiment, the low acidity, ordered mesoporous material used in the catalyst support has the following composition:

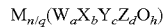

$$M_{n/q}(W_aX_bY_cZ_dO_h)$$

wherein W is a divalent element, such as a divalent first row transition metal, e.g., manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+ d)=1. In an embodiment, (a+b+c) is greater than d, and h=2. A further embodiment is when a and d=0, and h=2. In the as-synthesized form, the mesoporous material has a composition, on an anhydrous basis, expressed empirically as follows:

$$rRM_{n/q}(W_aX_bY_cZ_dO_h)$$

wherein R is the total organic material not included in M as an ion, and r is the coefficient for R, i.e., the number of moles or mole fraction of R. The M and R components are associated with the material as a result of their presence during synthesis of the material and are easily removed or, in the case of M, replaced by post-synthesis methods hereinafter more particularly described.

To the extent desired, the original M, e.g., ammonium, sodium or chloride, ions of the as-synthesized material can be replaced, at least in part, by ion exchange with other ions. Conventional ion-exchange methods can be used. Replacing ions, by way of example, include metal ions, hydrogen ions, hydrogen precursor, e.g., ammonium, ions and mixtures thereof. Other ions include rare earth metals and metals of Groups IA (e.g., K), IIA (e.g., Ca), VIIA (e.g., Mn), VIIIA (e.g., Ni), IB (e.g., Cu), IIB (e.g., Zn), IIIB (e.g., In), IVB (e.g., Sn), and VIIB (e.g., F) of the *Periodic Table of the Elements* (Sargent-Welch Co. Cat. No. S-18806, 1979) and mixtures thereof.

In addition to the low acidity, ordered mesoporous material, the support can further comprise additional materials, particularly additional inorganic materials. For example, inorganic materials may be used as binders, or to dilute and therefore control the amount of active mesoporous material present in the support. Inorganic diluents can be inert or, optionally, can have a catalytic functionality. Suitable inorganic diluent materials include, by way of example, alumina or silica and the like, or precursors to these materials such as Na-silicate and Al-nitrate. In this mode of use, the particulate inorganic oxides are not acting as binder materials but are primarily acting as bulk diluents although the material may still exert some binding function. Though the binder function can be performed by the particulate silicone resin, a separate binder can be used. In the calcined state of the support, it is believed that the binder function is provided by silica derived from the silicone resin on top of any other binder that may be present. In the uncalcined state (e.g., the dried state), it is believed that the binding, (i.e., the green strength) is in part derived from the resin as is. When used as diluents for supports comprising molecular sieves, the particulate inorganic materials may be present at the desired level to achieve the requisite dilution of molecular sieve. The amount of diluent material can be within the range of about 10 to 90 wt. %, or about 10 to 50 wt. %, or about 20 to 50 wt. % of the combined weight of diluent and molecular sieve material in the structure. The inorganic material may also or alternatively function as an aid to mass transport into and within the structured body. This can be advantageous when the inorganic material has large pores and high levels of porosity. The uncalcined binder material (the silicone resin) itself is not acidic. Thus the addition of silicone binding material should have a dilution function on the total acidity prior to calcination.

(II) Selective Hydrodesulfurization Processes

In another embodiment, the invention relates to a selective hydrodesulfurization process. More particularly, the invention relates to selective hydrodesulfurization of a naphtha boiling-range hydrocarbon.

Naphtha feedstocks suitable for hydrodesulfurization comprise one or more natural and/or synthetic hydrocarbons boiling in the range from about 50° F. to about 450° F. (10° C. to about 232° C.), at atmospheric pressure. The naphtha feedstock generally contains cracked naphtha which usually comprises fluid catalytic cracking unit naphtha (FCC catalytic naphtha), coker naphtha, hydrocracker naphtha, resid hydrotreater naphtha, debutanized natural gasoline (DNG), and gasoline blending components from other sources wherein a naphtha boiling range stream can be produced. In an embodiment, the feedstock is selected from FCC catalytic naphtha, coker naphtha, and combinations thereof. These feeds, based on olefin and sulfur content, typically benefit from selective hydrodesulfurization.

In an embodiment, the naphtha feedstock generally contains not only paraffins, naphthenes, and aromatics, but also unsaturates, such as open-chain and cyclic olefins, dienes, and cyclic hydrocarbons with olefinic side chains. The cracked naphtha feedstock generally comprises an overall olefins concentration ranging as high as about 60 wt. %, based on feedstock, more typically as high as about 50 wt. %, and most typically from about 5 wt. % to about 40 wt. %. The cracked naphtha feedstock can comprise a diene concentration of as much as 15 wt. %, but more typically ranges from about 0.02 wt. % to about 5 wt. % of the feedstock. High diene concentrations can result in a gasoline product with poor stability and color. The cracked naphtha feedstock sulfur content will generally range from about 0.05 wt. % to about 0.7 wt. % and more typically from about 0.07 wt. % to about 0.5 wt. %, based on the total weight of the feedstock. Nitrogen content will generally range from about 5 wppm to about 500 wppm, and more typically from about 20 wppm to about 200 wppm.

Hydrodesulfurization using the selective hydrodesulfurization catalysts can comprise a naphtha feedstock preheating step. The chargestock is preheated in feed/effluent heat exchangers prior to entering a furnace for final preheating to a targeted reaction zone inlet temperature. The feedstock can be contacted with a hydrogen-containing stream prior to, during, and/or after preheating. The hydrogen-containing stream can also be added in the hydrodesulfurization reaction zone. The hydrogen stream can be pure hydrogen or can be in admixture with other components found in refinery hydrogen streams. It is preferred that the hydrogen-containing stream have little, if any, hydrogen sulfide. The hydrogen stream purity should be at least about 50% by volume hydrogen, preferably at least about 65% by volume hydrogen, and more preferably at least about 75% by volume hydrogen for best results.

The reaction zone can consist of one or more fixed bed reactors each of which can comprise a plurality of catalyst beds. Since some olefin saturation will take place, and olefin saturation and the desulfurization reaction are generally exothermic, consequently interstage cooling between fixed bed reactors, or between catalyst beds in the same reactor shell, can be employed. A portion of the heat generated from the hydrodesulfurization process can be recovered and where this heat recovery option is not available, cooling may be performed through cooling utilities such as cooling water or air, or through use of a hydrogen quench stream. In this manner, optimum reaction temperatures can be more easily maintained.

In an embodiment, the hydrodesulfurization process uses a reactor inlet temperature below the dew point of the feedstock so that the naphtha fraction will not be completely vaporized at the reactor inlet. As the hydrodesulfurization reaction begins when the naphtha feed contacts the catalyst, some of the exothermic heat of reaction is absorbed by the endothermic heat of vaporization, thus achieving 100% vaporization within the bed (dry point operation). By transferring some of the heat of reaction to vaporization, the overall temperature rise across the reactor is moderated, thus reducing the overall extent of olefin hydrogenation with only small reductions in hydrodesulfurization. The degree of vaporization is defined by the ratio of the inlet dew point temperature ($T_{DP}$, R) of the naphtha feedstock to the reactor inlet temperature ($T_{IN}$, R), where R is the absolute temperature in degrees Rankine. The dew point temperatures can be calculated by computer software programs, such as Pro/II, available from Simulation Sciences Inc. In the present configuration, the $T_{DP}/T_{IN}$ ratio should be greater than or equal to 0.990, but less than the ratio at which dry point operation is not achieved within the catalyst bed. That is, the ratio extends up to the point at which the operation stays all mixed phase in the reactor. The ratio limit may vary somewhat depending on selected operating conditions. The 0.990 ratio is specified to account for uncertainties in the measurement of the inlet temperature including variance in the location of the temperature measurement and uncertainties in the calculation of the actual dew point; however, the naphtha feedstock should not be completely vaporized at the reactor inlet.

In an embodiment, hydrodesulfurization of the naphtha feedstocks are performed under the following conditions:

| Conditions | Broad | Preferred |
|---|---|---|
| Temp (° C.) | 232-371 | 260-354 |
| Total Press (kPa) | 1480-5617 | 1480-3549 |
| $H_2$ Feed Rate ($m^3/m^3$) | 35.6-890 | 35.6-445 |
| $H_2$ Purity (v %) | 50-100 | 65-100 |
| LHSV[1] | 0.5-15 | 0.5-10 |

[1]Liquid Hourly Space Velocity

Reaction pressures and hydrogen circulation rates below these ranges can result in higher catalyst deactivation rates resulting in less effective selective hydrotreating. Excessively high reaction pressures increase energy and equipment costs and provide diminishing marginal benefits.

(III) Methods for Making Selective Hydrodesulfurization Catalysts

The selective hydrodesulfurization catalysts are supported catalysts, in which the support comprises a low acidity, ordered mesoporous material. Such catalysts can be made by impregnating a low acidity, ordered mesoporous material with the catalytic metal(s). Conventional methods in which the catalytic metal is contained in an aqueous precursor can be used. Aqueous precursors can further comprise an organic complexing agent, as described in *Chem. Soc. Chem. Commun.* 22, 1684 (1987).

In an embodiment, impregnation of the hydrodesulfurizing metal or metals on the catalyst support can be performed using incipient wetness techniques. An amount of water to just wet all of the support is determined and added. The aqueous impregnation solutions are added such that the aqueous solution contains the total amount of hydrogenation component metal(s) to be deposited on the given mass of support. When more than one hydrodesulfurizing metal is to be used, impregnation can be performed for each metal separately, including an intervening drying step between impregnations, or as a single co-impregnation step. The saturated support can then be separated, drained, and dried in preparation for calcination.

In another embodiment, impregnation of the hydrodesulfurizing metal or metals is on the calcined low acidity, ordered mesoporous support material which has been mixed with silicone resin. Calcination generally is performed at a temperature of from about 480° F. to about 1,200° F., or more preferably from about 800° F. to about 1,100° F. The low acidity, ordered mesoporous supports have relatively low levels of inorganic binder and have been manufactured without the use addition of organic solvents, i.e., they are free of added organic solvent. By use of the term "free of added organic solvent", it is intended that present support materials either contain no added organic solvent, or that if amounts of organic solvents are present in the support materials, they are present in such minor amounts that their presence will not adversely affect the integrity of the silica binder formed upon calcination. The amount of solvent which any given support material may tolerate is determined by comparing the physical properties, especially the crush strength, of the silica bound support material with and without the organic solvent. It is preferred that no organic solvent be added to the support material. It is preferred to use water instead of added organic solvents in the manufacturing process.

When organic solvents are omitted from the support formulation, calcined supports have higher compressive strength than calcined supports formed using organic solvents. Impregnation of the calcined support can be accomplished as described above for the catalyst support. Conventional methods can be used to make catalyst supports. Such methods generally include the steps of mixing batch materials, which have as their main constituents particulate inorganic material (and, optionally, binder), blending the mixture, forming or shaping the batch into a green body, drying, and subsequently cacining the green body to form the support. Usually the forming is undertaken via extrusion or via other methods that require the application of pressure and/or heat such as compression molding. It is conventional to add such additives as lubricants, extrusion aids, plasticizers, and burn-out agents (e.g., graphite) to the batch during the mixing step, which may be needed to control properties such as batch viscosity. Binders, when used, can be inorganic, organic, or a combination thereof. Organic binders are temporary binders because they can be removed during heat-treating such as calcination, but they may assist in maintaining the green strength of the structured body extrudate after extrusion. In an embodiment, the green support is free of organic binder, and the formed and calcined support is also free of organic binder residues. In addition to raw materials, porosity is also dependent on the firing temperature. The higher the firing temperature, the more dense (less porous) the resulting fired structure. Conventional extrusion procedures and equipment can be used, including the use of extrusion aids.

In an embodiment, the support material is a low acidity, ordered mesoporous support material. Ordered mesoporous support materials can be synthesized using amphiphilic compounds, as hereinafter described, and especially high silica/alumina ratio mesoporous materials, especially the high surface area mesoporous aluminosilicate and silicate materials designated as M41S silica materials such as for example MCM-41 and MCM-48.

Such materials can be made using from a homogeneous formable mixture comprising support material, silicone resin, optional extrusion aid and water. The mixture components are combined to form a homogeneous or substantially homogeneous mixture without the addition of organic solvent. The dry ingredients are first combined, e.g., dry blended in an intensive mixer, and then water is added in an amount to enable the formation of an extrudable mixture. Typical water amounts form a mixture that is at least about 20 wt. % solids, or at least 30 wt. % solids, or at least about 40 wt. % solids, based on the weight of the mixture. Solids typically range from about 20 to 70 wt. % solids, or about 30 to 70 wt. % solids, based on the weight of the mixture. Conventional mixing equipment, e.g., mix-muller or high shear mixers, and "noodling dies" can be used.

By way of example, some suitable mixture compositions (by weight) include about 25 to 95 wt. % support material, and about 5 to 75 wt. % silicone resin.

Extrusion aids can be added in amounts ranging from about 1 to 5 wt. %, or, alternatively, about 1 to 2 wt. %, or 1.5 wt. % or less. In an embodiment, the extrudate contains sufficient support material to yield a final calcined support comprising:
(i) support material in an amount ranging from about 40 to 95 parts by weight (wt. %), or, alternatively, 70 to 95 wt. %, or 80 to 95 wt. %, and
(ii) silica in an amount ranging from about 5 to 60 parts wt. %, or, alternatively, 5 to 20 wt. %, or 5 to 10 wt. %, the wt. % being based on the weight of the extrudate.

After extrusion, drying, and calcination, the extrudate comprises:
(i) support material in an amount ranging from about from about 50 to 99.5 parts by weight (wt. %), or, alternatively, about 75 to 95 wt. %, or about 80 to 95 wt. %, or about 90 to 95 wt. %, and
(ii) silica in an amount ranging from about 0.5 to 50 parts by wt. %, or, alternatively, about 5 to 25 wt. %, or about 5 to 20 wt. %, or about 5 to 10 wt. % silica.

Such supports can be made using silicone resin of defined average particle size. The use of a silicone resin in this form enables the support material to be extruded without the use of high levels of additional organic or undesirable inorganic binder materials, with the minimal amount necessary of organic extrusion aids and importantly without the use of organic solvents. This enables green extrudates of high strength to be produced. This approach also enables support materials to be produced, which have high contents of active catalytic material (90 wt. % or greater) and which have high compressive strengths after calcination. The silicone resin of defined average particle size is converted in-situ to a silica binder upon calcination. The resultant calcined support material contains a primarily low acidity silica binder, which is highly desirable for many applications especially where the support material comprises ordered mesoporous materials.

Conventional silicone resins can be used. In an embodiment, the silicone resin is used in particulate form as opposed to an emulsion, or a solution or in the form of flakes. The particulate silicone resins of this embodiment have the following properties:
(i) The particulate silicone resins can have an average particle size of about 700 μm or less, preferably about 600 μm or less. Expressed in terms of a range, the average particle size of the particulate silicone resin can range from about 0.01 to about 700 μm or, alternatively, about 0.02 to about 600 μm, or about 0.1 to about 450 μm.
(ii) The particulate silicone resins have a minimum particle size ranging from at least about 2 μm to at least about 25 μm.
(iii) The particulate silicone resin remains solid at ambient temperature (i.e., room temperature or below the forming temperature used to prepare the support, e.g., below the extrusion or compression molding temperature).
(iv) The particulate silicone resins can have a softening point such that under the selected pressures and temperatures of forming, e.g., extrusion or compression molding, it melts or flows or is able to coalesce. The silicone resin can re-solidify on cooling after extrusion or compression molding.
(v) The particulate silicone resins can have a silicon oxide content of at least 50% by weight and a degree of cross-linking of 1.5 or less or, alternatively, 1.3 or less, or 1.2 or less.
(vi) The particulate silicone resins can have a viscosity of at least about 20 centipoise (60% solids in toluene, though the use of a solvent is optional) or, alternatively, at least about 30 centipoise, or at least about 50 centipoise.
(vii) The particulate silicone resins have a weight average molecular weight within the range of about 1000 to 10,000 or, alternatively, about 2000 to 7000, or about 2000 to 4000.
(viii) The particulate silicone resins have a silanol content of at least about 3 wt. % or, alternatively, at least about 5 wt. %

The silicone resin can be a single silicone resin or a combination of silicone resins, which meet the above criteria. Silicone resins include polysiloxanes containing a repeating silicon-oxygen backbone and organic groups attached to a proportion of the silicon atoms by silicon-carbon bonds, including linear, branched and/or cross-linked structures. Silane monomers are the precursors of silicones and the nomenclature of silicones makes use of the letters M, D, T and Q to represent monofunctional, difunctional, trifunctional and quadrifunctional monomer units. Primes, e.g., D' are used to indicate substituents other than methyl. Examples of formulas and their corresponding symbols for silicones are provided in Table 1.

TABLE 1

| Formula | Functionality | Symbol |
|---|---|---|
| $(CH_3)_3SiO_{0.5}$ | Mono | M |
| $(CH_3)_2SiO$ | Di | D |
| $(CH_3)SiO_{1.5}$ | Tri | T' |
| $(CH_3)(C_6H_5)SiO$ | Di | D' |
| $(CH_3)(H)SiO$ | Di | D' |
| $SiO_2$ | Quadri | Q |

In an embodiment, the silicone resins are the polysiloxanes with alkyl and/or aryl and/or glycol groups. The alkyl groups can include 1 to 12 carbons, and more particularly 6 to 10 carbons. The resins can be crosslinkable silicones containing reactive silanol groups. Examples of suitable silicone resins are those that originate from methyl hydrogen polysiloxane and phenyl methyl polysiloxanes. High activity silicones can be used, such as Dow Corning Q6-2230 silicone resin, sometimes referred to as Dow Corning® 233 flake resin.

After forming, e.g., by extrusion, the resulting-shaped green material can be optionally dried to remove the water used in forming the composition mixture. Conventional drying methods can be used, alone or in combination. Drying times range for a period of about one minute to about 12 hours or more. In an embodiment, drying is accomplished by placing the green material in an oven at a temperature in the range of 50° to 100° C., or 90° to 100° C. Drying forms a crack-free, self-supporting structure. The support is calcined following extrusion and optional drying.

During calcination, the silicone resin is converted to silica, which acts as an inorganic binder for the particulate inorganic material in the calcined support. Conventional calcination conditions and equipment can be used. For example, the extrudate may be calcined in an oxygen-containing atmosphere, preferably air, at a rate of 0.2° C. to 5° C. per minute to a temperature greater 300° C., but below a temperature at which the crystallinity of the molecular sieve is adversely affected. Generally, such temperature will be in the range 400° C. to 1000° C., preferably below 600° C. Preferably the temperature of calcination is within the approximate range of 350° C. to 550° C. The product is maintained at the calcination temperature usually for 1 to 24 hours.

In an embodiment, the dried support body is first calcined at a temperature in the range of 400° C. to 1000° C., preferably 400 to 600° C., most preferably 450 to 550° C., in an inert atmosphere, which is preferably flowing nitrogen. The preferred flow rate is within the range of 1 to 10 v/v/hr, preferably 2 to 8 v/v/hr, and most preferably is a flow rate of 5 v/v/hr. The first stage is undertaken for a period between 1 to 24 hours, preferably 1 to 10 hours, and most preferably for 2 hours. This first stage is then followed by a second calcination stage in an oxidizing atmosphere; preferably the oxidizing atmosphere is 100% air. The second stage is undertaken for a period of 1 to 24 hours, preferably 1 to 12 hours, and most preferably for between 6 to 13 hours. The flow rate for the oxidizing gas is within the range of 1 to 10 v/v/hr, preferably 2 to 8/v/hr, and most preferably is a flow rate of 5 v/v/hr. The temperature of the second stage is within the range 400° C. to 1000° C., preferably 400 to 600° C., most preferably 450 to 550° C. The switchover from the first stage to the second stage is gradual and is typically undertaken over a period of 1 to 10 hours, more preferably 1 to 5 hours, and most preferably 2 to 4 hours.

While not wishing to be bound by any theory or model, it is believed that the use of a silicone resin enables the particulate inorganic material to be extruded without the use of high levels of additional organic or undesirable inorganic binder materials, without excessive amounts of organic extrusion aids, and without the use of organic solvents. The resulting support materials can have high contents of mesoporous support material (90 wt. % or greater) and retain a degree of compressive strength after calcination. Since calcination converts in-situ the silicone resin of defined average particle size to a silica binder, the resultant calcined support contains particulate inorganic material in the presence of a primarily low acidity silica binder.

The most common binder for molecular sieves is alumina. Using silica as a binder in molecular sieves is difficult and is not simply a matter of replacing alumina with silica. Conventional silica binders typically involve the use of caustic and water with the silica gel and powdered silica in the preparation of the silica binder. In the case of mesoporous materials of the M41S family, caustic may damage the support structure. Moreover, MCM-41S family members, e.g., MCM-41, have high sorption capacity and thus require large amounts of water. This leads to processing difficulties such as over peptizing and solidifying before the mesoporous material can be extruded. Moreover, the use of alumina binders can alter the overall acidity of the support material. Alumina is more acidic than silica thus resulting in a support that can be sufficiently acidic to cause significant olefin saturation during the hydrodesulfurization process.

In an embodiment, hydrodesulfurization metals can be added following calcination of the mesoporous support materials. Impregnation of the hydrodesulfurizing metal or metals on the catalyst support can be performed using incipient wetness techniques. An amount of water is added to just wet all of the support is determined. The aqueous impregnation solutions are added such that the aqueous solution contains the total amount of hydrogenation component metal(s) to be deposited on the given mass of support. When more than one hydrodesulfurizing metal is to be used, impregnation can be performed for each metal separately, including an intervening drying step between impregnations, or as a single co-impregnation step. The saturated support can then be separated, drained, and dried.

The following examples are presented to illustrate the invention and should not be considered limiting in any way.

EXAMPLE 1

Catalyst Support Preparation

A mixture was prepared for extrusion by blending about 90 wt. % of MCM-41 crystal that had been calcined, and 10 wt. % $SiO_2$ equivalent of Dow Corning 6-2230 silicone resin (which had been milled to <30 US mesh), in an Eirich mixer for 5 minutes. Water was added to adjust the solids in the mixture to 42 wt. %, and 1.5 wt. % polyvinylalcohol was added as an extrusion aid. This mixture was allowed to ball up into 1/16" to 1/8" spheres prior to extrusion. The extrusion was run with a 1/16" cylinder die plate and at 11.5 amps. During the extrusion steam was given off and there was noticeable condensation on the outside surface of the die. The extrudate was dried at 250° F. overnight and was then calcined in nitrogen followed by air. The compressive strength after calcination was measured as 54 lb/in.

EXAMPLE 2

Support Acidity Measurements

Potential catalyst support samples were evaluated for acidity in accordance with a 2-methyl-2 pentene reaction test. As discussed, skeletal isomerization rates generally increase with relative increasing acid strength, and consequently, the ratio of methyl group migration rate to double bond shift rate (the "Rate Ratio" herein) increases with increasing acid strength. The equilibrium value for the ratio of $(cis/trans)_3$-methylpent-2-ene (3 MP2) to $(cis/trans)_4$-methylpent-2-ene (4 MP2) is near 4.4. It should be noted that Support A, which is an amorphous silica-alumina, has an acidity on the alpha scale of about 1, corresponding to a Rate Ratio value of approximately 3.85.

The tests were conducted under the following conditions: 250° C. temperature, 1.0 atm. pressure, 1.0 g catalyst, 2.0 hours on feed, with a feed comprising 11.2 ml/min. of 2-methyl-2 pentene and 150 ml/min of helium.

Support A comprised 87 wt. % silica and 13 wt. % alumina and is the amorphous silica-alumina Davison MS-13. Support B comprised Davisil amorphous silica powder of unknown purity. Support C comprised MCM-41 containing 90.7 wt. % silica and 9.3 wt. % alumina without binder. Support D comprised MCM-41 containing 99.7 wt. % silica and 0.3 wt. % alumina without binder. Support E comprised 35 wt. % alumina binder and 65 wt. % Support D (MCM-41 containing 99.7 wt. % silica and 0.3 wt. % alumina). Support F comprised 10 wt. % silica binder and 90 wt. % Support D (MCM-41 containing 99.7 wt. % silica and 0.3 wt. % alumina).

| Support | Feed Conversion (Mol. %) | CT4MP2 rate (Mol/hr/g × 10³⁾ | CT3MP2 rate (Mol/hr/g × 10³⁾ | Rate Ratio (Equilibrium 4.4) |
|---|---|---|---|---|
| A | 73.6 | 2.57 | 9.90 | 3.85 |
| B | 24.0 | 0.05 | 0.017 | 0.34 |
| C | 77.5 | 2.18 | 9.25 | 4.24 |
| D | 65.2 | 3.08 | 8.42 | 2.73 |
| E | 75.4 | 2.38 | 9.97 | 4.20 |
| F | 45.7 | 4.03 | 1.63 | 0.40 |

As stated above, Support A, which is an amorphous silica-alumina, has an acidity measured by the alpha test of about 1. The acid catalytic activity of a zeolite may be measured by its "alpha value", which is the ratio of the rate constant of a test sample for cracking normal hexane to the rate constant of a standard reference catalyst (U.S. Pat. No. 3,354,078 and in *The Journal of Catalysis*, Vol. IV, pp. 522-529 (August 1965), both of which are incorporated herein by reference). The alpha test is insensitive to differentiation of the very low levels of acidity discerned in the 2-methyl-2 pentene reaction test, differences which affect selectivity for olefin saturation during HDS. That is, the Rate Ratio values less than the amorphous silica-alumina value in the 2-methyl-2 pentene reaction test (approximately 3.85) would all be reported at 1 in the alpha test. Thus, on the typical alpha acidity scale, it is necessary but not sufficient to have the lowest measured acidity value, alpha value =1.

The amorphous silica sample, Support B, has a low acidity compared with the amorphous silica-alumina (Support A). The framework alumina containing MCM-41, Support C shows a high acidity, nearly at the equilibrium value. The same mesoporous material prepared without alumina, Support D, is characterized by a low acidity value. This support can further be formulated with a binder to achieve Support E and Support F. It is clear from this example that the addition of alumina binder to the MCM-41 material, Support E, results in much higher acidity than the MCM-41 material bound with silica, Support F. In these examples, Supports A, C and E are too acidic for use as the catalyst support.

EXAMPLE 3

Catalyst Acidity Measurements

Catalyst A comprised Support D (MCM-41 containing 99.7 wt. % silica, 0.3 wt. % alumina) with approximately 7.4 wt. % CoO and 28.5 wt. % MoO₃. Catalyst B comprised Support C (MCM-41 containing 90.7 wt. % silica and 9.3 wt. % alumina) with approximately 7.4 wt. % CoO and 28.5 wt. % MoO₃. Catalysts were evaluated in the oxide form. Test results are set out in the following table.

| Catalyst | Feed Conversion (Mol. %) | CT4MP2 rate (Mol/hr/g × 10³⁾ | CT3MP2 rate (Mol/hr/g × 10³⁾ | Rate Ratio |
|---|---|---|---|---|
| A | 39.0 | 2.79 | 0.95 | 0.34 |
| B | 44.4 | 3.41 | 2.04 | 0.60 |

Catalyst A, comprising MCM-41 of the highest silica content compared to the other MCM-41 catalyst, has the lowest acidity. Catalyst B, which contains some alumina, has an appreciably higher acid strength, but is still low acidity as that term is used herein. Although the measured acidities for both of these catalysts are considered low, the inherent higher acidity of the support used to prepare Catalyst B results in higher acidity in the final catalyst. This comparison illustrates that the support acidity should be used as the indicator of acidity for the purpose of choosing a suitable support to achieve high selectivity. The example below will illustrate that the higher acidity of the support manifests as diminished catalyst selectivity in a catalyst performance test.

EXAMPLE 4

Comparison of Acidity on Catalyst Selectivity

In a micro-unit model feed test, catalysts were evaluated on a feed consisting of 36% Hexene-1, 32% n-Heptane, 32% Toluene, 1950-2000 wppm Sulfur as Thiophene, and 19 wppm Nitrogen as Tetrahydroquinoline. Reaction conditions were 200 psig total reaction pressure, WHW=14.7, $H_2$/feed=6.1. Catalysts were presulfided in a separate reactor and transferred for model feed analysis.

Catalyst C is a CoMo/MCM-41 catalyst (7.4% CoO and 28.5% MoO₃) on MCM-41 containing 99.7 wt. % silica and 0.3 wt. % alumina (Catalyst A) and has been sulfided prior to use. Catalyst D is a CoMo/MCM-41 catalyst (7.4% CoO and 28.5% MoO₃) on MCM-41 containing 90.7 wt. % silica and 9.3 wt. % alumina (Catalyst B) which has also been sulfided prior to use.

The relative rates of HDS to olefin saturation (OSAT) were calculated as the natural log of the inverse of the normalized fraction of sulfur or olefins remaining in the product. The selectivity ratio presented in the FIGURE is the ratio of these two values.

The alumina containing catalyst, Catalyst D, shows lower selectivity than the lower acidity siliceous catalyst, Catalyst C. As one familiar with the art would observe, both these catalysts would traditionally be considered to demonstrate high selectivity towards retention of olefins. In this invention, we distinguish those supports characterized by Rate Ratio values measurably below the equilibrium value 4.4 (ratio of (cis/trans)t-3-methylpent-2-ene (t-3 MP2) to (cis/trans)₄-methylpent-2-ene (4 MP2)), preferably below the value for amorphous-silica alumina (approximately 3.85) from those with values near the equilibrium as measured in accordance with a 2-methyl-2 pentene reaction test. In this example, the support used to prepare Catalyst C (Support D) has a much lower acidity than the support used to prepare Catalyst D (Support C). This difference in support acidity is observed in the performance of the catalyst as selectivity for olefin retention.

EXAMPLE 5

Comparison of Mesoporous Order (Ordered versus Amorphous) on Catalyst Selectivity Catalysts were tested in a small pilot plant on an intermediate cat naphtha feed. Catalyst A comprised Support D (MCM-41) containing 99.7 wt. % silica, 0.3 wt. % alumina) with approximately 7.4 wt. % CoO and 28.5 wt. % MoO₃. Catalyst E comprised Support B (Davisil amorphous silica powder of unknown purity) with approximately 7.4 wt. % CoO and 28.5 wt. % MoO$_3$. The reactors were loaded with 4.0 cc of catalyst. The catalysts were sulfided with a 10% H$_2$S/H$_2$ gas blend at approximately a 10 L/hr gas rate at 1652 kPa (225 psig) for two, 12-hour holding periods at temperatures of 204 to 343° C. (400° F. and 650° F.). Temperature was reduced to 93° C. (200° F.) and 100% H$_2$ was introduced into the reactor followed by the intermediate cat naphtha feed. The test was performed in an isothermal, downflow, all-vapor-phase pilot plant. The intermediate cat naphtha had a 5/95% boiling range of 68 to 186° C. (155 to 367° F.), 1425 wppm total sulfur, 33 wppm nitrogen, and 64.6 bromine number. The catalysts were allowed to line out on feed at 274° C. (525° F.) and 1652 kPa (225 psig) before the test. Test reactor conditions were 302° C. (575° F.), 356 m$^3$/m$^3$ (2000 scf/B), 100% hydrogen treat gas, 1652 kPa (225 psig) total inlet pressure, and an LHSV of 5.4 hr$^{-1}$. Product from Catalyst A had 97.73% sulfur removal and a 33.13% bromine number reduction. Product from Catalyst E had 96.44% sulfur removal and a 41.18% bromine number reduction.

At greater HDS, the catalyst based on the mesoporous-ordered (MCM-41) support saturated fewer olefins (shows greater selectivity) than the catalyst based on an amorphous support. Co/Mo catalyst on a mesoporous MCM-41 support is more selective than a Co/Mo reference catalyst on an amorphous support, i.e., the mesoporous catalyst has a higher HDS/OSAT (olefin saturation) ratio than the reference catalyst. Although the amorphous support had a lower equilibrium rate ratio in the acidity test in Example 1, the catalyst based on this support is less selective (saturates more olefins) than the catalyst based on the mesoporous-ordered support. The novel structure of mesoporous-ordered supports increases the selectivity performance of the final catalyst.

The invention claimed is:

1. A selective hydrodesulfurization process, comprising: contacting a naphtha feedstream containing sulfur and olefin with a catalytically effective amount of a catalyst comprising at least one hydrodesulfurizing metal supported on a low acidity, ordered mesoporous support material under selective catalytic hydrodesulfurization conditions, the low acidity, mesoporous support material having a Rate Ratio less than 3.85.

2. The process of claim 1 wherein the hydrodesulfurizing metal is a Group VIA metal, a non-noble Group VIIIA metal, and combinations thereof.

3. The process of claim 1 wherein the hydrodesulfurizing metal is Co/Mo.

4. The process of claim 3 where the Co/Mo atomic ratio is from about 0.25 to about 0.72.

5. The process of claim 1 wherein the low acidity, ordered mesoporous support has a median pore diameter is from about 2 to about 50 nm.

6. The process of claim 3 wherein the Mo is in the form of MoO$_3$ having a surface concentration of from about 1×10$^{-4}$ to about 2×10$^{-4}$ g MoO$_3$/m$^2$.

7. The process of claim 1 wherein the low acidity, mesoporous support is bound with a silica binder derived from silicone resin.

8. The process of claim 7 wherein the silica binder is derived from a silicone resin having an average particle size of about 700 μm or less.

9. The process of claim 8 wherein the silicone resin has an average molecular weight of from 1,000 to 10,000.

10. The process of claim 1 wherein the Rate Ratio is less than 3.00.

11. The process of claim 1 wherein the hydrodesulfurization conditions include temperatures of from about 232° C. to about 371° C., pressures of from about 1480 to about 5617 kPa, liquid hourly space velocities of from about 0.5 to about 15, and hydrogen feed rates of from about 35.6 to about 890 m3/m3.

12. The process of claim 1 wherein the low acidity, ordered mesoporous support material is MCM-41.

13. The process of claim 1 wherein the catalyst contains from about 4 to about 40 wt. % of hydrodesulfurizing metal, based on catalyst.

14. A selective hydrodesulfurization process, comprising: contacting a naphtha feedstream containing sulfur and olefin with a catalytically effective amount of a catalyst comprising at least one hydrodesultbrizing metal supported on a low acidity, ordered mesoporous support material and silica binder derived from silicone resin under selective catalytic hydrodesulfurizing conditions, the low acidity. mesoporous support material having a Rate Ratio less than 3.85.

15. The process of claim 14 wherein the hydrodcsulfbrizing metal is a Group VIA metal, a non-noble Group VillA metal, arid combinations thereof.

16. The process of claim 14 wherein the hydrodesulfurizing metal is Co/Mo.

17. The process of claim 16 where the Co/Mo atomic ratio is from about 0.25 to about 0.72.

18. The process of claim 14 wherein the low acidity, ordered mesoporous support has a median pore diameter is from about 2 to about 50 nm.

19. The process of claim 16 wherein the Mo is in the form of MoO3 having a surface concentration of from about 1×10–4 to about 2×10–4 g MoO3/m2.

20. The process of claim 14 wherein the silica binder is derived from a silicone resin having an average particle size of about 700 μm or loss.

21. The process of claim 20 wherein the silicone resin has an average molecular weight of from about 1,000 to about 10,000.

22. The process of claim 14 wherein the Rate Ratio is less than 3.00.

23. The process of claim 14 wherein the hydrodesulfurization conditions include temperatures of from about 232°C. to about 371 ° C., pressures of from about 480 to about 5617 kPa, liquid hourly space velocities of from about 0.5 to about 15, and hydrogen feed rates of from about 35.6 to about 890 m3/m3.

24. The process of claim 14 wberein the low acidity, ordered mesoporous support material is MCM-41.

25. The process of claim 14 wherein the catalyst contains from about 4 to about 40 wt. % of hydrodesulfurizing metal, based on catalyst.

* * * * *